United States Patent Office 3,799,799
Patented Mar. 26, 1974

3,799,799
COATING OF MICA REINFORCEMENT FOR
COMPOSITE MATERIALS
Raymond T. Woodhams, Toronto, Ontario, and Frank J. Golemba, Sarnia, Ontario, Canada, assignors to Fiberglas Canada Limited, Toronto, Ontario, Canada
No Drawing. Filed Apr. 1, 1971, Ser. No. 130,473
Int. Cl. B44d 1/02
U.S. Cl. 117—100 S          16 Claims

ABSTRACT OF THE DISCLOSURE

The preparation of high performance composite mica-polymer material. In one system polystyrene is coated onto mica flakes having a high aspect ratio of at least about 20, and preferably in the range of 50 to 100 or higher. The mica flakes are coated with the polymer by in situ polymerization onto the mica particles in suspension. Various additive materials may be employed to enhance the efficiency of the in situ coating step. For example, a silane coupling agent may be added to an aqueous slurry of the mica particles. As another example a copolymerizable monomer such as dimethylaminoethyl-methacrylate (DMAEMA) may be added. The coated mica particles are filtered and the resultant composite powder is useful for the molding of high performance composite particles.

---

This invention relates to a method of coating mica particles for use in a formation of high performance composite shaped articles.

The invention involves the formation of a molding powder useful in forming such composite articles, by the step of coating mica with polymer. The molding powder may be shaped by conventional means.

The mica flakes are coated by in situ polymerization of the monomer material onto the surface of the flakes. This procedure enables the preparation of molding powders containing a high weight percent of mica. The polymer may be evenly distributed discontinuously or continuously onto the surface of the mica particles. By use of the present invention, it is possible to prepare composite materials of polymer and mica flakes in which the flakes are not subject to such rigorous treatment as has been the case in prior methods.

The present method of making composite mica-polymer materials by in situ polymerization provides conditions under which the mica particles have their entire surface area at least partly covered uniformly with polymer, and this conditions has not been achieved by other means. In this manner we may obtain molding powders, which are useful in the formation of high weight fraction composites.

The present invention therefore provides a method of coating flakes of high aspect ratio mica material for use in the formation of reinforced composite mica-polymer articles, comprising the step of coating the flakes of mica with polymeric material by polymerizing monomer in situ on the surface of the mica particles, in a suspension thereof. In a principal aspect, the high aspect ratio mica flakes are in an aqueous suspension during the polymerization step, and the monomer is a water suspension polymerizable monomer which include certain slightly soluble monomers, which form insoluble polymers.

The present invention further provides a method for coating flakes of mica material with a polymer of a water suspension polymerizable monomer compound, said mica flakes having an average aspect ratio of at least 20, comprising the steps of forming an aqueous slurry of the mica flakes, adding the polymerizable monomer compound and an initiator, and reacting with agitation to polymerize the monomer in situ on the surface of the mica flakes.

The present invention further provides such a method for coating flakes of mica material with a polymer of a water suspension polymerizable monomer, said mica flakes having an average aspect ratio of at least 20, comprising the steps of forming an aqueous slurry of the flakes, removing entrained oxygen from the slurry, adding a silane as an adhesion promoter, adding the water suspension polymerizable compound to the slurry, adding an oil soluble initiator, and reacting, with agitation, to polymerize the monomer in situ on the surface of the mica flakes. The monomer will preferably be chosen from vinyl, olefinic and vinylidene monomers.

The present invention further provides such a method for coating flakes of mica material with a polymer of a vinyl compound, said mica flakes having an average aspect ratio of at least 20, comprising the steps of forming an aqueous slurry of the mica flakes, removing entrained oxygen from the slurry, adding a silane as an adhesion promoter, adding a vinyl monomer compound and an oil soluble initiator, and reacting with agitation to polymerize the vinyl monomer in situ on the surface of the mica flakes. In a preferred embodiment, the vinyl monomer compound is a styrene compound having the formula

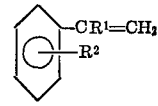

wherein $R^1$ and $R^2$ are chosen from halogen, alkyl, and hydrogen.

The coated mica flakes will normally be de-watered to form a mobile powder which can be moulded or shaped by pressure to form a composite shaped article having high performance characteristics.

In one aspect of such variation, the process further comprises the step of de-watering the slurry, adding further monomers to the coated powder, and polymerizing the further monomer to form a reinforced composite particle. The monomer may contain some dissolved resins, such as polyester resins.

In another aspect, the process further comprises the steps of de-watering the slurry, mixing the powder with finely divided polymer, and forming the resulting mixture under pressure to form a high performance composite shaped article.

In another aspect, the process further comprises mixing the slurry with a latex suspension.

The polymerizable monomer, such as styrene, will normally be added step-wise to the reaction slurry, whereby to minimize bead formation.

The slurry may comprise further fillers or reinforcing materials, for example, fine glass fibers.

The silanes to be employed in certain preferred aspects of this invention are salts of compounds having the formula $SiR^1R^2R^3(CH_2)_xR^4$, wherein $R^1$, $R^2$, and $R^3$ are alkoxy groups and $R^4$ is an aminoalkyl group.

The mica is high aspect ratio mica, which is defined as a ratio of width to thickness of at least about 20, and preferably in the range of 20 to 100. The mica will preferably be chosen from the group consisting of muscovite, phlogopite, vermiculite and biotite.

The present invention further provides such a method for coating flakes of mica material with a styrene compound, said mica flakes having an average aspect ratio of 20 to 100, comprising the steps of forming an aqueous slurry of the flakes, removing entrained oxygen from the slurry, adding a minor proportion of dimethylaminoethyl-methacrylate (DMAEMA) as a copolymerizable monomer, and reacting with agitation, to polymerize the styrene monomer in situ on the surface of the mica flakes.

The present invention further provides such a method for coating flakes of mica material with a polymer of a vinyl compound, said mica flakes having an average aspect ratio of at least 20, comprising the steps of forming an aqueous slurry of the flakes, removing entrained oxygen from the slurry, adding a minor proportion of dimethylaminoethylmethacrylate (DMAEMA) as a copolymerizable monomer, adding the vinyl monomer compound and an oil soluble initiator, and reacting with agitation to polymerize the vinyl monomer in situ on the surface of the mica flakes.

The DMAEMA will preferably be present in a ratio of about DMAEMA: styrene monomer=1:20.

The present invention further provides such a method wherein the silane is γ-amino propyl triethoxy silane acrylic acid salt (sold by the Union Carbide Corporation under the trademark A1112).

In addition, we have also used other silanes, for example, glycidoxypropyltrimethoxysilane (sold by Dow Corning under the trademark Z6040). This material was also found to promote encapsulation without the undue presence of free unattached polymer. The strength and modulus of rupture obtained from composite material formed by the use of this silane were somewhat lower overall than those characteristics from examples made from the previous silane. However, this first conclusion was based on a limited number of tests.

As will be understood by those skilled in the art, the concentrations of the various ingredients will depend greatly on the particular reaction being carried out. However, some figures are set out hereunder for the purpose of illustrating preferred embodiments of the invention. For example the concentration of the mica slurries may go as high as 40 to 50% by weight of mica based on the weight of the slurry. The upper limit of concentration may be determined by the viscosity. The mica slurry must remain suspended during the polymerization reaction, and this will be aided by the agitation which is applied during reaction. Regarding such agitation, it appears to be important to retain low speed mixing with a low shear, to minimize damage to the mica particles.

An important feature of one aspect of the present invention is the use of silane or a highly polar copolymerizable monomer as a transition material in the overall process of coating mica particles with a firmly bonded polymer of a water suspension polymerizable monomer.

The mica should have a high average aspect ratio, which measurement is based on the ratio of diameter to thickness. The aspect ratio should be at least 20 and will preferably be in the range of 20 to 100. After coating of the flakes by the polymerized monomer there should be a little if any interconnecting of the mica flakes by the polymer, if a free flowing powder is desired.

As copolymerizable monomers we have found that dimethylaminoethylmethacrylate (DMAEMA) is very suitable, however, other basic monomers such as the vinyl pyridines, vinyl acetate, methacrylonitrile, acrylonitrile, acrylates, and methacrylates are helpful in promoting encapsulation or coatings of mica particles in connection with the polymerization in situ or other monomers.

As oil soluble initiator we have had good success with azobisisobutyronitrile (AIBN). However, other initiators may be used, with success.

The amount of silane or DMAEMA types of bridging material to be used will vary rather widely depending upon the particular reaction conditions employed. For example in charges consisting of 450 milliliters of water 60 grams of mica and 20 grams of polymerizable monomer, we have found that suitbale encapsulation was achieved when the silane was present in an amount of 2.1 gram, 1.0 gram or 0.5 gram, in the reaction mix.

We have polymerized styrene onto mica to produce molding powders having 40%, 50%, 75%, and 95% by weight of mica. However, we did not achieve finely divided powder over the whole range. A change from essentially separate to interconnected flakes appears to occur around the region of 50% mica in the composites.

We prefer to use mica of a type which is known as T–40 mica. This is a water ground mica which is normally —140 mesh on the U.S. standard scale. Suitable material of this type is supplied by the Franklin Mineral Products Company. Typical screen analysis of this material are as follows:

| Mesh | Percent by wt. |
|---|---|
| +140 | 37.8 |
| —140, +200 | 26.6 |
| —200, +325 | 24.2 |
| —325 | 11.4 |

Another suitable type of mica is what we have called Blaw-Knox (B-K) mica. This is a mica fraction commonly having particle size of —140 to +200 mesh on the U.S. standard scale. It is obtained by screening T–40 mica on a Blaw-Knox screen using 140 to 200 mesh screens. Typical screen analysis of BK mica yields the following:

| Mesh | Percent by wt. |
|---|---|
| —140 | 4.4 |
| —140, +200 | 48.6 |
| —200, +325 | 40.8 |
| —325 | 6.2 |

The Blaw-Knox (B-K) mica which is referred to in the examples is a mica fraction nominally having a particle size of —140 to +200 mesh, on the U.S. standard scale and an average aspect ratio of 35 to 38.

Mica fraction obtained by other methods are also usable.

EXAMPLE 1

Phlogopite mica was prepared in a colloid mill and sieved to obtain a final product of aspect ratio 50. Sixty gms. of the phlogopite were treated with a silane coupling agent (Union Carbide A–1112) (trademark), to promote interfacial adhesion prior to addition to 500 ml. of oxygen-free distilled water and 20 gms. of styrene monomer, 0.02 gm. of azobisisobutyronitrile catalyst was then added, the mixture placed in a 32 ounce pressure resistant glass bottle and flushed with purified nitrogen before capping. The mixture was polymerized with end-over-end agitation for 72 hours at 60° C. The coarse precipitate was easily filtered, washed, and dried. The dry molding powder (28 grams) was compression molded at 200° C. and 5000 p.s.i. and the specimen slowly cooled. The resulting test bar (0.13″ x ¾″ x 8.5″) was tested in flexure using a 4″ span. The flexural modulus was $10.6 \times 10^6$ p.s.i. and the flexural strength $12.9 \times 10^3$ p.s.i.

EXAMPLE 2

This example illustrates the effect of volume loading on the composite flexural properties. Styrene (20.8 gm., 0.2 mole) and dimethylaminoethyl methacrylate (1.58 gm., 0.01 mole) were added to a stirred suspension of muscovite mica platelets in 100 ml. distilled water. The mica was previously separated by air elutriation using an Infrasizer in order to isolate the portion having an average aspect ratio of 70. Acid treatment of the mica (in boiling, aqua regia, nitric acid: hydr. 3:1), was carried out to convert the surface of the mica to an acidic state which would react strongly with the basic comonomer with the formation of ionic bonds. The mixture was purged with nitrogen and 0.02 gm. azobisisobutyronitrile catalyst added to promote polymerization. This mixture was stirred and heated for 16 hours at 60° C. when the polymerization was complete. The resulting precipitate consisting of crumbs containing mica platelets completely encapsulated with the copolymer, was filtered, washed, and oven dried at 70° C. The dry powder was easily molded with shear into rectangular test specimens (1" x 3" x 1/10") at 200° C. and 20,000 p.s.i. for 30 minutes. After slow cooling the samples were tested according to ASTM D-790 for flexural strength and flexural modulus. These results are given in Table I.

TABLE I.—EFFECT OF VOLUME LOADING OF MUSCOVITE MICA ON FLEXURAL MODULUS AND FLEXURAL STRENGTH

[Aspect ratio=70]

| | Flexural modulus, p.s.i.×10⁶ | Flexural strength, p.s.i.×10³ |
|---|---|---|
| Volume fraction mica: | | |
| .25 | 3.25 | 10.1 |
| .35 | 5.10 | 13.8 |
| .45 | 6.9 | 16.0 |
| .60 | 9.8 | 17.0 |

EXAMPLE 3

Muscovite mica (Blaw-Knox processed-water ground) was purchased screened (50%, −140, +200 mesh). 60.0 grams of the mica was dispersed in 460 g. of distilled water. The water was boiled for ½ hour and then cooled to ambient temperature. During this time, the suspension was kept under an atmosphere of nitrogen. 2.1 g. of a silane coupling agent (Union Carbide A1112) was added to the suspension and the stirring was continued for 30 minutes. The above mixture was transferred to a 30 ounce "pop" bottle to which was added 5.0 g. distilled styrene and 0.005 g. azobisisobutyronitrile (AIBN). The contents were then flushed with nitrogen before capping. Polymerization was carried out in a water bath whose temperature was set at 55° C. for 20 hours. The bottles tumbled end-over-end. After 20 hours, 15.0 g. distilled styrene and 0.015 g. AIBN were added; the contents were flushed again with nitrogen, capped, and polymerization was continued for 48 hours at 55° C. The material was filtered, washed, and dried under vacuum at 80° C.

This procedure was repeated many times. The weight percent mica was calculated to be 75–77% based on the loss on ignition at 550° C. The powder was compression moulded into bars (0.13" x ¾" x 8.5") at various temperatures and pressures. In general, the flexural modulus ranged from 6.0 to 7.0×10⁶ p.s.i., and the flexural strength was 17,000 to 25,000 p.s.i. From duplicate samples Izod impact strengths of 0.97±0.03 ft.-lb./in. (notched) and 2.00±0.06 ft.-lb./in. (unnotched) were found.

EXAMPLE 4

This procedure was the same as in Example 3, except the muscovite mica was precoated with the silane A1112 in a thick water slurry. The mica was dried at 110° C. This coated mica was used in the encapsulation procedure described in Example 3. The flexural modulus was 6.0×10⁶ p.s.i. and the flexural strength was 18,000 p.s.i.

EXAMPLE 5

This procedure was the same as in Example 3, except that phlogopite mica was used instead of muscovite mica. The phlogopite mica was ground in a colloid mill and sieved to give a sample at −140, +200 mesh. Samples of composite material formed therefrom have exhibited a flexural modulus as high as 11×10⁶ p.s.i. and a flexural strength as high as 20,000 p.s.i.

EXAMPLE 6

This procedure was similar to Example 3 except the AIBN concentration is increased by a factor of ten, and the polymerization times are decreased to 4 and 12 hours. The dried sample was 83% by weight mica and a molded bar had a flexural modulus of 9.3×10⁶ p.s.i., and a flexural strength of 29,000 p.s.i.

EXAMPLE 7

This procedure was the same as in Example 3 except all the monomer and catalyst were added in one step and the polymerization carried out for 72 hours. This method was relatively successful but periodically beads rich in polymer were formed, rather than evenly encapsulated mica.

EXAMPLE 8

This procedure was the same as Example 7 except DMAEMA (dimethylaminoethylmethacrylate) was used as the coupling agent. This formulation has been used to prepare materials in 1, 2, and 100 litre reactors. The formulation for the run in the 100 litre reactor was as follows:

(1) 57 lb. distilled water.
(2) 14.3 lb. dry ground muscovite mica (designated 100K).
(3) Boiled for 45 minutes under a nitrogen atmosphere and cooled to ambient temperature.
(4) 0.55 lb. DMAEMA added.
(5) 10.5 lb. styrene added (Dow Chemicals, with 2.4 p.p.m. TBC as inhibitor).
(6) 0.0055 lb. AIBN added.

The polymerization was carried out at 55° C. for 72 hours. The material collected for the reactor was filtered and dried. The encapsulated material was 66% by weight mica. Moulded samples exhibited a flexural modulus of 2.2×10⁶ p.s.i. and a flexural strength of 8×10³ p.s.i.

EXAMPLE 9

The formulation and procedure described in Example 3 was also used to encapsulate mica successfully when the silane A1112 was replaced by Dow Corning Z-6030.

EXAMPLE 10

15.4 gallons of distilled water were charged to a 25 imperial gallon stainless steel reactor. To this was added 75 lb. of T-40 mica with stirring. The water was boiled under nitrogen sparging for ½ hour and then the reactor contents were cooled to 60° F. Maintaining the nitrogen sparge 1210 g. of A1112 silane was added. After ½ hour, 2866 g. of styrene (plastic grade—Polymer Corporation) and 57.6 g. of AIBN were added and the temperature raised to 160° F. After 2 hours, another 18¾ lb. of styrene and 172.8 g. AIBN were added. After 2 hours the agitation ceased and the reactor was allowed to cool over 10 hours. After drying 100 lbs. of powdery material was recovered.

The material was found to be 76 weight percent mica based on loss on ignition at 550° C. The powder was compression molded into bars (0.13" x ¾" x 8.5") at 230 C. for ½ hour at 7000 p.s.i. The average flexural strength and modulus of these bars was 17,500 p.s.i. and 5.9×10⁶ p.s.i. respectively.

EXAMPLE 11

This procedure was the same as Example 3, except that 2.1 g. of U.C. A1112 was replaced by 1.0 g. of DMAEMA.

F.S. _____ p.s.i._ 18,900
F.M. _____ p.s.i._ 5.9×10⁶
Percent mica _____ 76.5

EXAMPLE 12

This procedure was the same as Example 3, except that no silane was used and 5.0 and 15.0 g. of a solution made up of 1.0 g. of DMAEMA and 19.0 g. of styrene were added.

Percent mica _____ 77.0
F.S. _____ p.s.i._ 22,300
F.M. _____ p.s.i._ 6.7×10⁶

EXAMPLE 13

This procedure was the same as Example 3, except that 1.0 g. of Dow Corning Z-6040 silane was used in place of U.C. A1112.

Percent mica _____ 74.7
F.S. _____p.s.i__ 17,300
F.M. _____p.s.i__ $5.4 \times 10^6$

EXAMPLE 14

This procedure was similar to Example 13, but using 2.1 g. of D.C. Z-6050 silane. Some sticking to the bottle walls is observed;

Percent mica _____ 77.6
F.S. _____p.s.i__ 16,600
F.M. _____p.s.i__ $5.5 \times 10^6$

EXAMPLE 15

To 450 ml. of distilled water was added 60 g. of B.-K. mica. The stirred slurry was boiled under a nitrogen atmosphere for ½ hour and cooled. The contents were charged to a 30 ounce pop-bottle with 20 g. of a degassed ($N_2$ sparge) solution containing 6 g. of acrylonitrile and 14 g. of styrene. 0.02 g. of AIBN was added, and the contents of the bottle sparged with nitrogen for 5 minutes. After capping, the bottle was tumbled end-over-end at 55° C. for 68 hours. The dried powder contained 79.5% mica and bars molded as in Example 3 exhibited a flexural strength and modulus of 19,800 p.s.i. and $6.2 \times 10^6$ p.s.i. respectively.

EXAMPLE 16

60.0 g. of Muscovite mica (Blaw-Knox) was treated with boiling water as in Example 3. To the slurry was added 0.5 g. of sodium bisulfite and 1.0 g. of ammonium persulfate, which, together form a water soluble initiator system, 6.0 g. of acrylonitrile were added. After stirring for one hour, under a nitrogen atmosphere, excess water was removed and the contents were added to a 30 oz. pressure resistant "pop" bottle along with 400 g. of deaerated water and 14.0 g. styrene monomer. The contents were tumbled at 55° C. for 48 hours. After filtering and drying, bars molded in Example 1, on testing exhibited an average flexural strength and modulus of 23,100 p.s.i. and $7.70 \times 10^6$ p.s.i. respectively.

We claim:

1. A method for coating flakes of mica material with a polymer of a water suspension polymerizable monomer, said mica flakes having an average aspect ratio of at least 20, comprising the steps of forming an aqueous slurry of the flakes, removing entrained oxygen from the slurry, adding thereto, as an adhesion promoter, a silane having the formula: $SiR^1R^2R^3(CH_2)_3R^4$, wherein $R^1$, $R^2$ and $R^3$ are alkoxy groups and $R^4$ is an aminoalkyl group, or a basic vinyl monomer which is copolymerizable with a polymerizable styrene compound having the formula

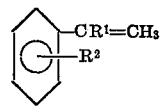

wherein $R^1$ and $R^2$ are chosen from halogen, alkyl, and hydrogen, adding said styrene compound to said slurry, adding an oil soluble initiator, and reacting, with agitation, to polymerize said styrene compound in situ on the surface of the mica flakes.

2. A method as in claim 1 wherein the adhesion promotor is dimethylaminomethacrylate.

3. A method as in claim 2 wherein the mica flakes have an aspect ratio of 20 to 100.

4. A method as in claim 2 wherein the dimethylaminoethylmethacrylate is present in a dimethylaminoethylmethacrylate: styrene monomer ratio of about 1:20.

5. A method as in claim 1 where in the polymerizable styrene compound is added in admixture with acrylonitrile or methylacrylonitrile.

6. A process for producing high performance composite shaped articles which comprises molding coated mica flakes produced according to claim 10 under pressure.

7. A process as set forth in claim 6 wherein the coated mica flakes are admixed with a polymerizable monomer before molding.

8. A process as set forth in claim 6 wherein the coated mica flakes are admixed with a finely divided polymer before molding.

9. A method as in claim 1 wherein the styrene compound is chosen from the group consisting of vinyltoluene; alpha-methyl styrene; and styrene.

10. A method as in claim 1 further comprising dewatering the resulting coated mica flakes to form a moldable powder.

11. A method as in claim 1 further comprising mixing the slurry with a latex suspension.

12. A method as in claim 9 wherein the styrene compound is styrene and the oil soluble initiator is azobisisobutyronitrile.

13. A method as in claim 12 wherein the styrene is added stepwise to the reaction slurry, whereby to minimize bead formation.

14. A method as in claim 1 wherein the slurry further comprises fine glass fibers.

15. A method as in claim 1 wherein the mica is high aspect ratio mica flakes chosen from the group consisting of muscovite, phlogopite, vermiculite and biotite.

16. A method as in claim 1 wherein the adhesion promotor is gamma amino propyl triethoxy silane acrylic acid salt.

References Cited

UNITED STATES PATENTS

| | | | |
|---|---|---|---|
| 2,871,204 | 1/1959 | Hopkins | 117—100 X |
| 3,443,492 | 5/1969 | Pleass | 117—100 X |
| 2,835,642 | 5/1958 | Safford | 117—123 X |
| 3,506,474 | 4/1970 | Neuhaus et al. | 117—161 X |
| 2,876,133 | 3/1959 | Iler et al. | 117—100 X |
| 3,094,501 | 6/1963 | Wahl et al. | 260—41 X |
| 2,513,268 | 6/1950 | Steinman | 260—41 X |
| 2,656,339 | 10/1953 | Padbury | 260—41 X |
| 2,936,487 | 5/1960 | Paz | 260—41 X |
| 3,519,593 | 7/1970 | Bolger | 260—41 X |
| 2,759,794 | 11/1956 | Coler | 260—41 X |

FOREIGN PATENTS 958,339  5/1964  Great Britain _____ 117—123 X

WILLIAM D. MARTIN, Primary Examiner

D. C. KONOPACKI, Assistant Examiner

U.S. Cl. X.R.

117—123 D, 161 UH, UN; 260—41 A

UNITED STATES PATENT OFFICE
CERTIFICATE OF CORRECTION

Patent No. 3,799,799      Dated March 26, 1974

Inventor(s) Raymond T. Woodhams et al

It is certified that error appears in the above-identified patent and that said Letters Patent are hereby corrected as shown below:

Column 1, line 51:    "conditions" should read "condition"

Column 2, line 42:    "particle" should read "article"

Column 4, line 24:    "-140" should read "+140"

Column 4, line 33:    "fraction" should read "fractions"

Claim 2, line 2:    "dimethylaminomethacrylate" should read "dimethylaminoethylmethacrylate"

Claim 5, line 3:    "methylacrylonitrile" should read "methacrylonitrile".

Signed and sealed this 13th day of May 1975.

(SEAL)
Attest:

RUTH C. MASON
Attesting Officer

C. MARSHALL DANN
Commissioner of Patents
and Trademarks